No. 852,890. PATENTED MAY 7, 1907.
E. MOEWES.
HINGED SHAFT COUPLING.
APPLICATION FILED FEB. 14, 1907.
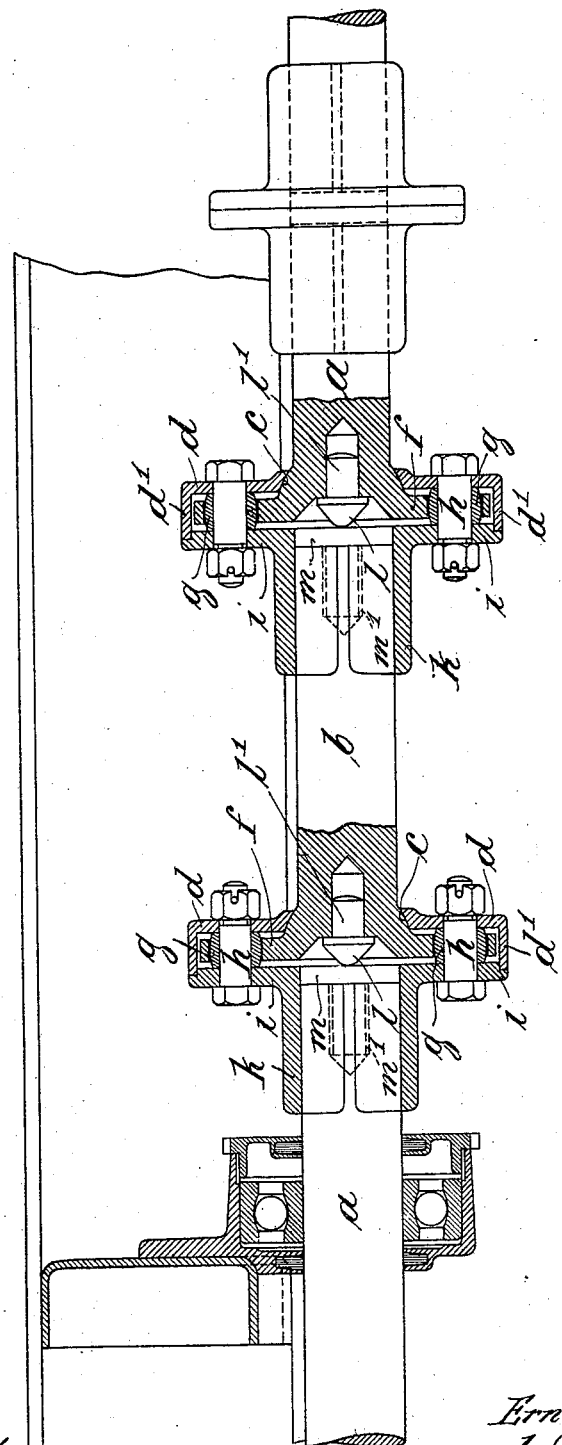
Witnesses.
Paul Wallenberg.
Paul Hinkelmann.
Inventor
Ernst Moewes.
by Krause Kupler
Attorney

UNITED STATES PATENT OFFICE.

ERNST MOEWES, OF STUTTGART-CANNSTATT, GERMANY, ASSIGNOR TO DAIMLER-MOTOREN-GESELLSCHAFT, OF UNTERTÜRKHEIM-STUTTGART, GERMANY.

HINGED SHAFT-COUPLING.

No. 852,890.     Specification of Letters Patent.     Patented May 7, 1907.

Application filed February 14, 1907. Serial No. 357,374.

*To all whom it may concern:*

Be it known that I, ERNST MOEWES, a subject of the King of Prussia, German Emperor, and a resident of Stuttgart-Cannstatt, in the Kingdom of Würtemberg, German Empire, have invented certain new and useful Improvements in Hinged Shaft-Couplings, of which the following is an exact specification.

My invention has for its purpose a hinged coupling or joint for shafts more especially for the main shaft of motor vehicles.

As known the main shaft of motor vehicles is subjected to torsional stresses and transverse stresses the latter being due to flexures of the vehicle frame. These flexures require the insertion of hinged mean part and different hinged joints have hitherto been inserted into the elongated motor shaft for the purpose of enabling the latter to follow the flexures of the frame. The known hinged shaft couplings however show the defect of transmitting badly axial forces occurring in the shaft and to avoid this drawback my invention is intended. To this effect I insert a hinge part into the elongated motor shaft and the one shaft end pushes with a globular piece against the adjacent part of the motor shaft. Of course it is not necessary to use such a mean part. It is sufficient to interrupt the elongated motor shaft and to joint both the adjacent ends in the manner as will now be fully described.

In order to make my invention more clear, I refer to the accompanying drawing, which represents the motor shaft in combination with the inserted hinge-part in a fragmentary longitudinal section.

$a$ is the elongated motor shaft and $b$ the mean-part inserted into the motor shaft and intended to be hinged to the latter. The one end of the mean-part $b$ is provided with a flange $f$ and with a globular surface $c$. $d$ is a cover bearing with a corresponding base on the globular face $c$ of the part $b$ and having a right-angled extremity $d'$ which embraces the flange $f$.

$h$ are screw bolts which pass through bodies $g$ having globular circumferential faces. These bodies $g$ are located in holes of the flange $f$.

$k$ is the coupling part fixedly secured with the part of the shaft adjacent to the mean piece $b$. The flange $i$ of the coupling part $k$ is provided with holes and also the cover $d$ is provided with such holes. The shaft of the screw bolt $h$ fits snugly into the body $g$ and the holes of the flange $i$ and cover $d$.

$l$ is a globular head resting with its shank $l'$ in a recess of the insertion $b$ and abutting against the step plate $m$ located within the coupling part $k$ and secured to the shaft end by means of a screw bolt $m'$.

The operation of the foregoing described structure will readily be understood. Due to the snugly fitting of the bolts $h$ into the flange $i$ the body $g$ and cover $d$, the parts $a$ and $b$ are rigidly connected with each other and the shaft is very suitable for transmitting torsional stresses. Furthermore the head $l$ abuts against the solid step bearing $m$ whereby the shaft of the motor is fit to transmit axial forces. Again the shaft can follow flexures of the carriage frame, due to the cover $d$ bearing against the globular face $c$ and the body $g$ being located with its globular circumferential face in corresponding holes of the flange $f$. In this way torsional as well as compressive stresses can easily be transmitted from one motor shaft to the other and notwithstanding there is a hinge-joint between them.

Having now particularly described the nature of my said invention, what I desire to secure by Letters Patent of the United States is:—

1. The hereindescribed hinge-joint between two parts of a shaft, more especially of the elongated shaft of a motor vehicle, which consists of a flange $(f)$ having a globular surface, a cover $(d)$, a coupling part $(k)$, screw bolts $(h)$ for connecting the coupling part $(k)$, the flange $(f)$ and the cover $(d)$ which latter bears against the said globular surface, a headed part $(l)$ abutting against the adjacent shaft end.

2. The hereindescribed hinge-joint between two parts of a shaft, more especially of the elongated shaft of a motor vehicle, which consists of a flange $(f)$ made integral with one end of the motor shaft, and having a globular face, a cover $(d)$ having a right-angled edge and bearing against the globular face of the flange $(f)$, the coupling part $(k)$ bearing against the said edge of the cover $(d)$, bodies $(g)$ located in recesses of flange $(f)$ and having globular circumferential faces, screw bolts (h) fitting snugly in recesses of the coupling part (k), the cover (d) and the body (g) and a headed part (l) and a step-plate (m) against which said headed part bears.

3. In the hereindescribed hinge-joint for motor shafts, a mean piece having at one end a flange (f) with a globular surface (c) in combination with a coupling part (k) secured to the other end of said mean part and a headed part (l) mounted in the recess of said mean part and a step plate (m) secured to said mean part and located within the said coupling part.

In witness whereof I have hereunto set my hand in the presence of two witnesses.

ERNST MOEWES.

Witnesses:
ROBERT UHLAND,
ERNST EUTTERMAN.